(12) United States Patent
Winkler et al.

(10) Patent No.: US 7,186,460 B2
(45) Date of Patent: Mar. 6, 2007

(54) EXTENSION AND UPSETTING SENSOR

(75) Inventors: Holger Winkler, Darmstadt (DE); Ralf Anselmann, Ramsau (DE)

(73) Assignee: Merck Patent GmbH, Darmstadt (DE)

( * ) Notice: Subject to any disclaimer, the term of this patent is extended or adjusted under 35 U.S.C. 154(b) by 94 days.

(21) Appl. No.: 10/503,081

(22) PCT Filed: Jan. 7, 2003

(86) PCT No.: PCT/EP03/00046

§ 371 (c)(1),
(2), (4) Date: Jul. 30, 2004

(87) PCT Pub. No.: WO03/064988

PCT Pub. Date: Aug. 7, 2003

(65) Prior Publication Data

US 2005/0145037 A1    Jul. 7, 2005

(30) Foreign Application Priority Data

Feb. 1, 2002 (DE) .................. 102 04 339

(51) Int. Cl.
*B32B 5/16* (2006.01)
(52) U.S. Cl. .............. 428/403; 75/862.381; 977/779; 977/953
(58) Field of Classification Search .......... 428/403; 977/779, 953; 75/862.381
See application file for complete search history.

(56) References Cited

U.S. PATENT DOCUMENTS

| | | | |
|---|---|---|---|
| 3,138,475 A | 6/1964 | Schröder et al. | |
| 3,258,349 A | 6/1966 | Scott | |
| 3,497,367 A | 2/1970 | Gaskin et al. | |
| 4,391,928 A | 7/1983 | Herman et al. | |
| 4,608,307 A | 8/1986 | Nakano et al. | |
| 4,703,020 A | 10/1987 | Nakano et al. | |
| 4,911,903 A | 3/1990 | Unger et al. | |
| 5,026,782 A | 6/1991 | Biale | |
| 5,053,441 A | 10/1991 | Biale | |
| 5,273,824 A * | 12/1993 | Hoshino et al. | 428/402.24 |
| 5,344,489 A | 9/1994 | Matijevic et al. | |
| 5,618,872 A | 4/1997 | Pohl et al. | |

(Continued)

FOREIGN PATENT DOCUMENTS

DE       10145450.3       9/2001

(Continued)

OTHER PUBLICATIONS

U.S. Appl. No. 10/529,793, filed Mar. 30, 2005, Winkler et al.

(Continued)

*Primary Examiner*—H. Thi Le
(74) *Attorney, Agent, or Firm*—Millen, White, Zelano & Branigan, P.C.

(57) ABSTRACT

The invention relates to core-shell particles comprising a shell which forms a matrix, and a core which is essentially solid and has an essentially monodisperse size distribution, the refractive index of the core material being different from that of the shell material. The invention especially relates to the use of said particles for producing sensors for detecting mechanical forces and sensors having an optical effect, essentially consisting of core-shell particles comprising a shell which forms a matrix and a core which is essentially solid and has an essentially monodisperse size distribution, the refractive index of the core material being different from that of the shell material. The inventive particles are characterised in that at least one contrast material is stored in the matrix.

20 Claims, 6 Drawing Sheets

U.S. PATENT DOCUMENTS

Figure 1:
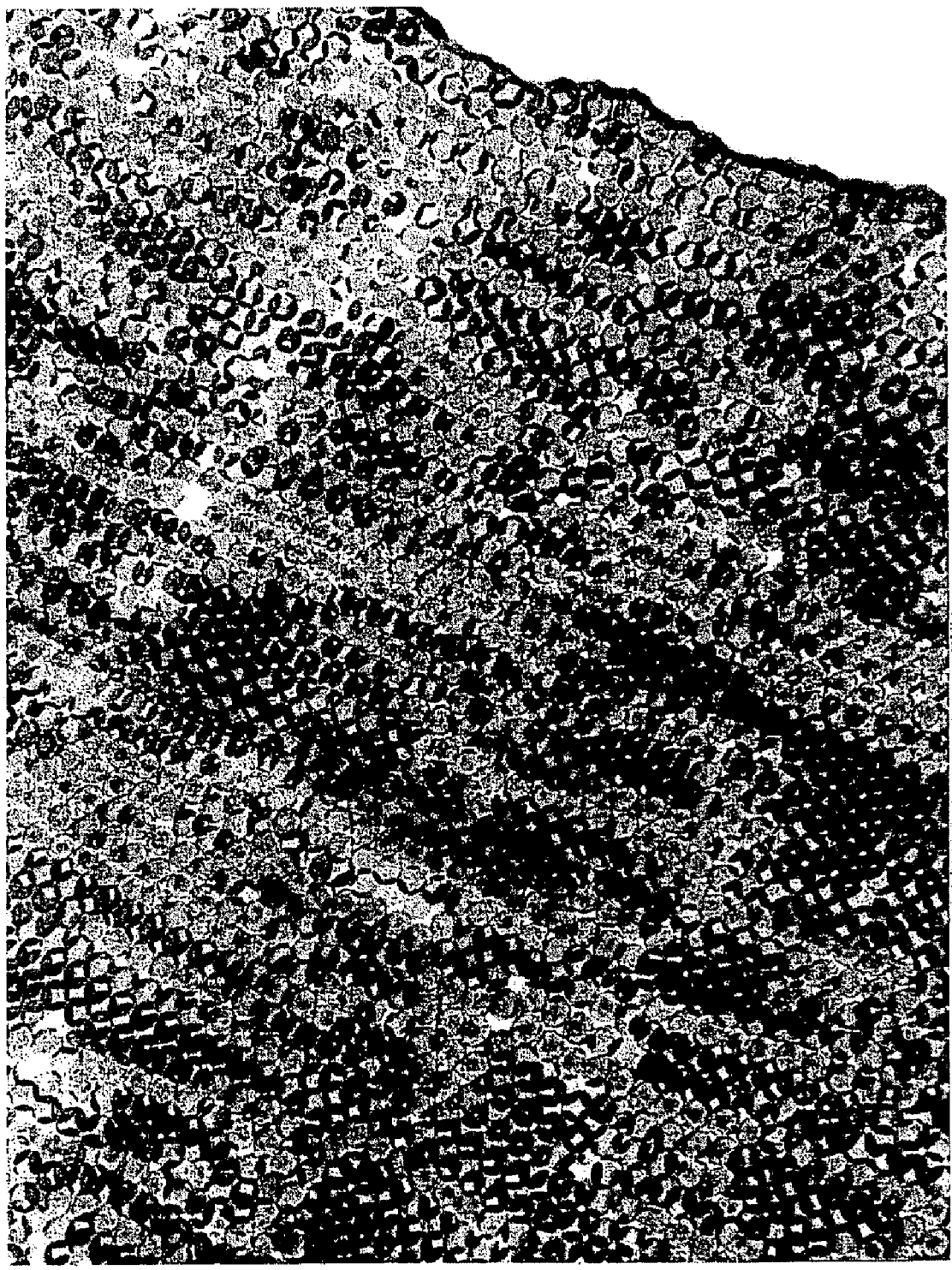

| | | | |
|---|---|---|---|
| 5,756,211 A | | 5/1998 | Ittmann et al. |
| 5,846,310 A | | 12/1998 | Noguchi et al. |
| 5,932,309 A | * | 8/1999 | Smith et al. .................. 428/46 |
| 6,254,831 B1 | * | 7/2001 | Barnard et al. .......... 422/82.08 |
| 6,276,214 B1 | * | 8/2001 | Kimura et al. ................. 73/795 |
| 6,303,055 B1 | * | 10/2001 | Yamada et al. ............. 252/516 |
| 6,337,131 B1 | * | 1/2002 | Rupaner et al. ............ 428/403 |
| 6,663,960 B1 | * | 12/2003 | Murakami et al. .......... 428/402 |
| 6,689,832 B1 | | 2/2004 | Rostami |
| 6,751,022 B2 | * | 6/2004 | Phillips ...................... 359/577 |
| 6,756,115 B2 | | 6/2004 | Fu et al. |
| 6,780,647 B2 | * | 8/2004 | Fujiwara et al. ............ 436/169 |
| 6,818,051 B2 | | 11/2004 | Albrecht et al. |
| 6,841,238 B2 | * | 1/2005 | Argoitia et al. ............. 428/323 |
| 6,863,847 B2 | | 3/2005 | Fu et al. |
| 6,875,808 B2 | | 4/2005 | Weier et al. |
| 6,881,787 B2 | | 4/2005 | Weier et al. |
| 2001/0019037 A1 | | 9/2001 | Zakhidov et al. |
| 2003/0116062 A1 | | 6/2003 | Anselmann et al. |
| 2004/0253443 A1 | | 12/2004 | Anselmann et al. |
| 2004/0262790 A1 | | 12/2004 | Fu et al. |
| 2005/0142343 A1 | | 6/2005 | Winkler et al. |
| 2005/0145037 A1 | | 7/2005 | Winkler et al. |
| 2005/0228072 A1 | | 10/2005 | Winkler et al. |
| 2006/0002875 A1 | | 1/2006 | Winkler et al. |

FOREIGN PATENT DOCUMENTS

| | | |
|---|---|---|
| DE | 102 04 338 | 2/2002 |
| EP | 0 141 388 A2 | 5/1985 |
| EP | 0469336 | 7/1991 |
| EP | 0 441 559 A2 * | 8/1991 |
| EP | 0644914 | 3/1995 |
| EP | 0955323 | 5/1999 |
| EP | 1 285 031 | 6/2003 |
| JP | 03 257081 | 11/1991 |
| WO | WO 93/08237 | 4/1993 |
| WO | WO 93/25611 | 12/1993 |
| WO | WO 00/12960 | 3/2000 |
| WO | WO 00/21905 | 4/2000 |
| WO | WO 01/086038 | 11/2001 |
| WO | WO 03/025035 | 3/2003 |

OTHER PUBLICATIONS

U.S. Appl. No. 60/253,932, filed Nov. 30, 2000, Fu et al.
U.S. Appl. No. 60/211,464, filed Jun. 15, 2000, Fu et al.
Chemical Abstracts, Bd. 116. Nr. 10, Mar. 9, 1992, Columbus, Ohio, seite 399.

* cited by examiner

EXTENSION AND UPSETTING SENSOR

The invention relates to the use of core/shell particles for the production of sensors for the detection of the action of mechanical force, and to corresponding sensors for the detection of the action of mechanical force and to a process for the production of sensors of this type.

The prior art discloses numerous methods for the detection of the action of mechanical forces. In particular, the measurement of elongation and compression processes and the determination of pressure are requirements which are frequently made in practice. Conventional detection systems for these mechanical influences utilise the changes in resistance in order to render the effects of mechanical forces visible. Thus, for example, European Patent Application EP-A-0 469 336 describes a resistive pressure sensor in which two or four ohmic resistors are attached to a membrane in such a way that the resistors closest to the edge are outside the membrane area in which maximum elongation or compression is expected. A sensor comprising conductive polymer particles is described in U.S. Pat. No. 6,276,214. The composite material from which the sensor is constructed consists of polymers and individual conductive particles which are dispersed in these polymers. The action of pressure changes the separation between these conductive particles, and the electrical resistance of the sensor changes correspondingly. The strength of the pressure can be calculated from the change in resistance.

In order to determine mechanical forces—in particular pressure—an instrument for measuring the resistance is basically necessary in the said detectors. For many applications, it would be desirable if detection systems for mechanical forces were available which allow at least qualitative recognition of the action of force directly using the human sensory organs.

The object of the present invention was to avoid the above-mentioned disadvantages and to provide sensors which allow the detection of mechanical forces using human sensory organs.

Surprisingly, it has now been found that it is possible to provide sensors of this type which allow visual detection of mechanical forces using the naked eye if certain core/shell particles are employed.

A first subject-matter of the present invention is therefore the use of core/shell particles whose shell forms a matrix and whose core is essentially solid and has an essentially monodisperse size distribution, where a difference exists between the refractive indices of the core material and shell material, for the production of sensors for the detection of the action of mechanical force.

In an embodiment which is preferred in accordance with the invention, the core/shell particles are converted into sensors, in particular films or injection mouldings, before they are used in accordance with the invention.

The use of films essentially consisting of core/shell particles whose shell forms a matrix and whose core is essentially solid and has an essentially monodisperse size distribution, where a difference exists between the refractive indices of the core material and shell material, as surface coating for the detection of the action of mechanical force on components is consequently a further subject-matter of the present invention.

For the purposes of the present invention, at least one contrast material is preferably incorporated into the matrix. This contrast material amplifies the optical effect of the core/shell particles during the action of force and thus simplifies visual detection.

The present invention furthermore relates to a sensor for the detection of the action of mechanical force, essentially consisting of core/shell particles whose shell forms a matrix and whose core is essentially solid and has an essentially monodisperse size distribution, where a difference exists between the refractive indices of the core material and shell material and at least one contrast material has been incorporated into the matrix.

For the production of a sensor of this type, the core/shell particles are mixed with at least one contrast material. The further processing of the mixture then depends on the intended spatial design of the sensor.

The present invention consequently also relates to a process for the production of sensors for the detection of the action of mechanical force which is characterised in that, in a first step, core/shell particles whose shell forms a matrix and whose core is essentially solid and has an essentially monodisperse size distribution, where a difference exists between the refractive indices of the core material and shell material, are mixed with at least one contrast material.

The term "sensor" below is taken to mean both the sensors which are expressly a subject-matter of the invention and also those which arise if core/shell particles in accordance with the definition given above are used in accordance with the invention.

Core/shell particles which can be employed in accordance with the invention are known per se.

EP-A-0 441 559 describes core/shell polymers having different refractive indices the layers and their use as additives for paper-coating compositions.

EP-A-0 955 323 describes core/shell particles whose core and shell materials are able to form a two-phase system and which are characterised in that the shell material is filmable and the cores are essentially dimensionally stable under the conditions of film formation of the shell, are only swellable by the shell material to a very small extent, or not at all, and have a monodisperse size distribution, with a difference between the refractive indices of the core material and shell material of at least 0.001. The production of the core/shell particles and their use for the production of effect colorants are also described. The process for the production of an effect colorant comprises the following steps: application of the core/shell particles to a substrate of low adhesive capacity, if necessary evaporation or expulsion of any solvent or diluent present in the applied layer, transfer of the shell material of the core/shell particles into a liquid, soft or visco-elastic matrix phase, orientation of the cores of the core/shell particles at least to form domains having a regular structure, curing of the shell material in order to fix the regular core structure, detachment of the cured film from the substrate, and, if a pigment or powder is to be produced, comminution of the detached film to the desired particle size. In these core/shell particles disclosed in EP-A-0 955 323, the core "floats" in the shell matrix; a long-range order of the cores does not form in the melt, merely a close-range order of the cores in domains. These particles are thus of only restricted suitability for processing by the usual methods for polymers.

The earlier German patent application DE 10145450.3 discloses mouldings having an optical effect which essentially consist of core/shell particles whose shell forms a matrix and whose core is essentially solid and has an essentially monodisperse size distribution. The refractive indices of the core material and shell material differ here, producing the said optical effect, preferably opalescence.

Especially the mouldings described in DE 10145450.3 are, if pretreated in suitable way, suitable for use according to this invention.

Figure 2:
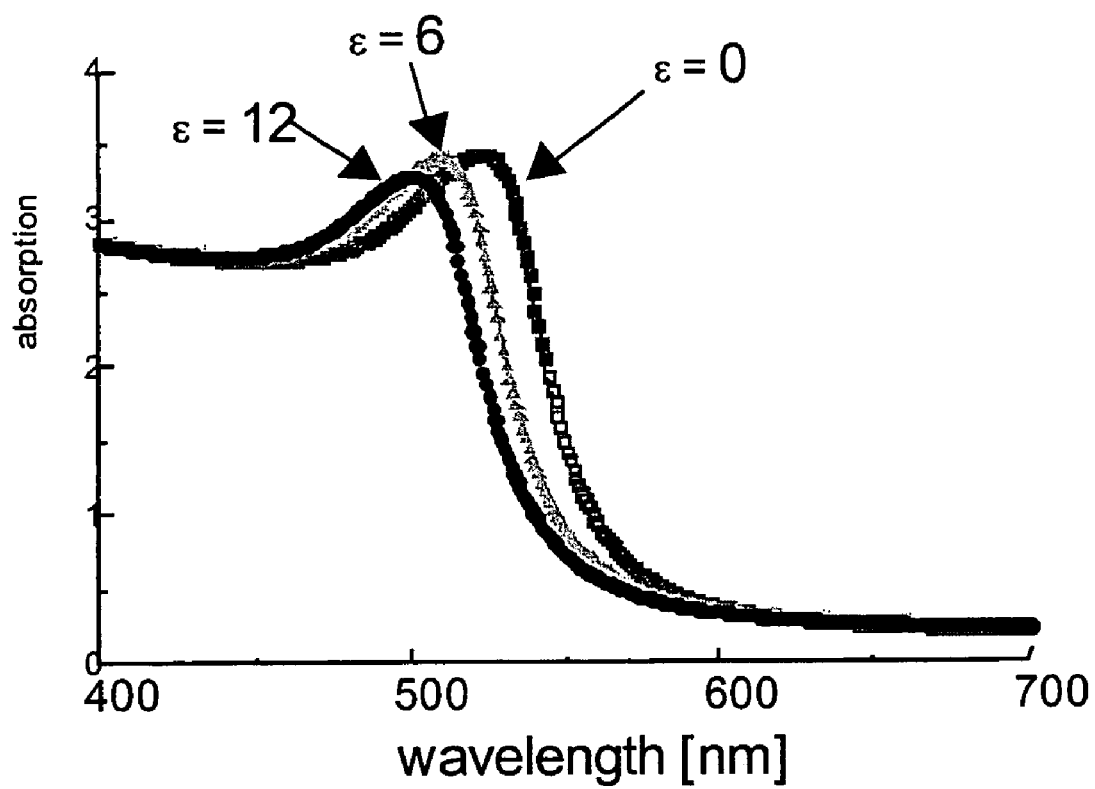

The effect utilised in accordance with the invention is the change in the colour of the sensor on elongation or compression of the sensor material (FIG. 2). As disclosed in DE 101 45 450.3 and confirmed in FIG. 1, the core/shell particles form a so-called colloidal crystalline lattice when used in accordance with the invention or in the sensors according to the invention. This lattice is a close or closest packing of the core/shell particles or the cores in the shell matrix. The sensor colour observed is determined by the lattice separations of this colloid crystal. These separations change during elongation and compression processes, and consequently so does the colour observed.

The contrast materials preferably incorporated effect an increase in brightness, contrast and depth of the observed colour effects in the sensors according to the invention. For the purposes of the invention, the term contrast materials is taken to mean all materials which cause a strengthening of this type in the optical effect. The contrast materials are usually pigments.

For the purposes of the present invention, the term pigments here is taken to mean any solid substance which exhibits an optical effect in the visible wavelength region of light. In accordance with the invention, the term pigments is applied here, in particular, to substances which conform to the definition of pigments in accordance with DIN 55943 or DIN 55945. According to this definition, a pigment is an inorganic or organic, coloured or non-coloured colorant which is virtually insoluble in the application medium. Both inorganic and organic pigments can be employed in accordance with the invention.

Pigments can be divided into absorption pigments and lustre pigments in accordance with their physical mode of functioning. Absorption pigments are pigments which absorb at least part of visible light and therefore cause a colour impression and in the extreme case appear black. According to DIN 55943 or DIN 55944, lustre pigments are pigments in which lustre effects arise through directed reflection at metallic or strongly light-refracting pigment particles which are formed and aligned in a predominantly two-dimensional manner. These standards define interference pigments as lustre pigments whose colouring action is based entirely or predominantly on the phenomenon of interference. In particular, these are so-called mother-of-pearl pigments or fire-coloured metal bronzes. Of economic importance amongst the interference pigments are also, in particular, the pearlescent pigments, which consist of colourless, transparent and highly light-refracting platelets. Depending on the orientation in a matrix, they produce a soft lustre effect which is known as pearlescence. Examples of pearlescent pigments are guanine-containing pearl essence, pigments based on lead carbonates, bismuth oxide chloride or titanium dioxide mica. In particular, the titanium dioxide micas, which are distinguished by mechanical, chemical and thermal stability, are frequently employed for decorative purposes.

In accordance with the invention, it is possible to employ both absorption and lustre pigments, it also being possible, in particular, to employ interference pigments. It has been found that the use of absorption pigments is preferred, in particular for increasing the intensity of the optical effects. Both white and coloured or black pigments can be employed here, where the term coloured pigments is intended to mean all pigments which give a colour impression other than white or black, such as, for example, Heliogen™ Blue K 6850 (BASF, Cu phthalocyanine pigment), Heliogen™ Green K 8730 (BASF, Cu phthalocyanine pigment), Bayferrox™ 105 M (Bayer, iron oxide-based red pigment) or Chromium Oxide Green GN-M (Bayer, chromium oxide-based green pigment). Owing to the colour effects achieved, preference is in turn given amongst the absorption pigments to black pigments. For example, mention may be made here of pigment carbon black (for example the carbon black product line from Degussa (in particular Purex™ LS 35 and Corax™ N 115)) and iron oxide black, manganese black as well as cobalt black and antimony black. Black mica grades can also advantageously be employed as black pigment (for example Iriodin™ 600, Merck; iron oxide-coated mica).

It has been found that it is advantageous in accordance with the invention if the particle size of the at least one contrast material is at least twice as large as the particle size of the core material. If the particles of the contrast material are smaller, only inadequate optical effects are achieved. It is assumed that smaller particles interfere with the arrangement of the cores in the matrix and cause a change in the lattice which forms. The particles preferably employed in accordance with the invention, which have a size which is at least twice that of the cores, only interact locally with the lattice formed from the cores. Electron photomicrographs (see also Example 3) confirm that the incorporated particles only interfere with the lattice of core particles to a small extent, or not at all. The term particle size of the contrast materials, which are frequently also platelet-shaped as pigments, is in each case taken to mean here the largest dimension of the particles. If platelet-shaped pigments have a thickness in the region of the particle size of the cores or even below, the present studies show that this does not interfere with the lattice orders. It has also been found that the shape of the incorporated contrast material particles has little or no influence on the optical effect. Both spherical and platelet-shaped and needle-shaped contrast materials can be incorporated in accordance with the invention. The only factor of significance appears to be the absolute particle size in relation to the particle size of the cores. It is therefore preferred for the purposes of the invention if the particle size of the at least one contrast material is at least twice as large as the particle size of the core material, where the particle size of the at least one contrast material is preferably at least four times as large as the particle size of the core material, since the observable interactions are then even smaller.

A sensible upper limit for the particle size of the contrast materials arises from the limit at which the individual particles themselves become visible or impair the mechanical properties of the sensor owing to their particle size. Determination of this upper limits causes the person skilled in the art no difficulties at all.

Also of importance for the effect desired in accordance with the invention is the amount of contrast material employed. It has been found that effects are usually observed if at least 0.05% by weight of contrast material, based on the weight of the sensor, are employed. It is particularly preferred for the sensor to comprise at least 0.2% by weight and especially preferably at least 1% by weight of contrast material since these increased contents of contrast material generally also result, in accordance with the invention, in more intense effects.

Conversely, relatively large amounts of contrast material under certain circumstances adversely affect the processing properties of the core/shell particles and thus make the production of sensors according to the invention more difficult. In addition, it is expected that the formation of the lattice of core particles will be interfered with above a certain proportion of contrast material, which is dependent on the particular material, and instead oriented contrast material layers will form. It is therefore preferred in accordance with the invention for the sensor to comprise a maximum of 20% by weight of contrast material, based on the weight of the sensor, it being particularly preferred for the sensor to comprise a maximum of 12% by weight and especially preferably a maximum of 5% by weight of contrast material.

In a particular embodiment of the present invention, however, it may also be preferred for the sensors to comprise the largest possible amounts of contrast material or for the largest possible amounts of contrast material to be admixed with the core/shell particles. This is the case, in particular, if the contrast material is at the same time intended to increase the mechanical strength of the sensor.

The sensors according to the invention can be obtained essentially analogously to the process described in the earlier German patent application DE 10145450.3, with a mixture of the core/shell particles with at least one contrast material being employed instead of the core/shell particles.

The mixture of core/shell particles and contrast material is preferably subjected to a mechanical force at a temperature at which the shell is flowable.

In a preferred variant of the production of sensors according to the invention, the temperature at which the mixture is subjected to the mechanical force is at least 40° C., preferably at least 60° C., above the glass transition temperature of the shell of the core/shell particles. It has been found empirically that the flowability of the shell in this temperature range meets the requirements for economical production of the sensors to a particular extent.

In a likewise preferred process variant which results in the sensors according to the invention, the flowable mixtures are cooled under the action of the mechanical force to a temperature at which the shell is no longer flowable.

For the purposes of the present invention, the action of mechanical force can be the action of a force which occurs in the conventional processing steps of polymers. In preferred variants of the present invention, the action of mechanical force takes place either:

through uniaxial pressing or
action of force during an injection-moulding operation or during a transfer moulding operation,
during (co)extrusion or
during a calendering operation or
during a blowing operation.

If the action of force takes place through uniaxial pressing, the mouldings according to the invention are preferably films. Films according to the invention can preferably also be produced by calendering, film blowing or flat-film extrusion. The various ways of processing polymers under the action of mechanical forces are well known to the person skilled in the art and are revealed, for example, by the standard textbook Adolf Franck, "Kunststoff-Kompendium" [Plastics Compendium]; Vogel-Verlag; 1996.

If mouldings are produced by injection moulding, it is particularly preferred for the demoulding not to take place until after the mould with moulding inside has cooled. When carried out in industry, it is advantageous to employ moulds having a large cooling-channel cross section since the cooling can then take place in a relatively short time. It has been found that cooling in the mould makes the colour effects according to the invention much more intense. It is assumed that better disordering of the core/shell particles to form the lattice occurs in this uniform cooling operation. It is particularly advantageous here for the mould to have been heated before the injection operation.

In a preferred variant of the process according to the invention, a structured surface is simultaneously produced during the action of mechanical force. This is achieved by the tools used already having a surface structuring of this type. For example, injection moulding can be carried out using corresponding moulds whose surface produces this structuring or uniaxial pressing can also be carried out using compression moulds in which at least one of the compression moulds has a surface structuring. For example, imitation leather which has a leather-like surface structure and at the same time exhibits the colour effects discussed above and is thus suitable as decorative sensors can be produced using these methods.

The sensors according to the invention may, if it is technically advantageous, comprise auxiliaries and additives here. They can serve for optimum setting of the applicational data or properties desired or necessary for application and processing. Examples of auxiliaries and/or additives of this type are plasticisers, film-formation auxiliaries, flow-control agents, fillers, melting assistants, adhesives, release agents, application auxiliaries and viscosity modifiers, for example thickeners.

Particularly recommended are additions of film-formation auxiliaries and film modifiers based on compounds of the general formula $HO-C_nH_{2n}-O-(C_nH_{2n}-O)_mH$, in which n is a number from 2 to 4, preferably 2 or 3, and m is a number from 0 to 500. The number n can vary within the chain, and the various chain members can be incorporated in a random or blockwise distribution. Examples of auxiliaries of this type are ethylene glycol, propylene glycol, di-, tri- and tetraethylene glycol, di-, tri- and tetrapropylene glycol, polyethylene oxides, polypropylene oxide and ethylene oxide-propylene oxide copolymers having molecular weights of up to about 15,000 and a random or block-like distribution of the ethylene oxide and propylene oxide units.

If desired, organic or inorganic solvents, dispersion media or diluents, which, for example, extend the open time of the formulation, i.e. the time available for its application to substrates, waxes or hot-melt adhesives are also possible as additives.

If desired, UV and weathering stabilisers can also be added to the sensors. Suitable for this purpose are, for example, derivatives of 2,4-dihydroxybenzophenone, derivatives of 2-cyano-3,3'-diphenyl acrylate, derivatives of 2,2',4,4'-tetrahydroxybenzophenone, derivatives of o-hydroxy-phenylbenzotriazole, salicylic acid esters, o-hydroxyphenyl-s-triazines or sterically hindered amines. These substances may likewise be employed individually or in the form of a mixture.

The total amount of auxiliaries and/or additives is up to 40% by weight, preferably up to 20% by weight, particularly preferably up to 5% by weight, of the weight of the sensors. Accordingly, the sensors consist of at least 60% by weight, preferably at least 80% by weight and particularly preferably at least 95% by weight, of core/shell particles.

For the use according to the invention and the use in sensors according to the invention, it is desirable for the core/shell particles to have a mean particle diameter in the range from about 5 nm to about 2000 nm. It may be particularly preferred here for the core/shell particles to have a mean particle diameter in the range from about 5 to 20 nm, preferably from 5 to 10 nm. In this case, the cores may be known as "quantum dots"; they exhibit the corresponding effects known from the literature. In order to achieve colour effects in the region of visible light, it is particularly advantageous for the core/shell particles to have a mean particle diameter in the region of about 40–500 nm. Particular preference is given to the use of particles in the range 80–500 nm since in particles in this size range, the reflections of various wavelengths of visible light differ significantly from one another, and thus the colour shift occurs to a particularly pronounced extent.

Effects which can be employed in accordance with the invention for the detection of forces can be both effects in the visible wavelength region of light and, for example, also effects in the UV or infrared region. It has recently become customary to refer to effects of this type in general as photonic effects. All these effects are optical effects for the purposes of the present invention, where, in a preferred embodiment, the effect is opalescence in the visible region. In the sense of a conventional definition of the term, the sensors according to the invention are photonic crystals (cf. Nachrichten aus der Chemie; 49(9) September 2001; pp. 1018–1025).

It is particularly preferred in accordance with the invention for the core of the core/shell particles to consist of a material which is either not flowable or becomes flowable at a temperature above the melting point of the shell material. This can be achieved through the use of polymeric materials having a correspondingly high glass transition temperature ($T_g$), preferably crosslinked polymers, or through the use of inorganic core materials. The suitable materials in detail are described below.

A further crucial factor for the intensity of the observed effects is the difference between the refractive indices of core and shell. Sensors according to the invention preferably have a difference between the refractive indices of the core material and shell material of at least 0.001, preferably at least 0.01 and particularly preferably at least 0.1. If the sensors according to the invention are intended to exhibit photonic effects which can be detected with the naked eye, refractive index differences of at least 1.5 are preferred.

In a particular embodiment of the invention, further nanoparticles are included in the matrix phase of the sensors in addition to the cores of the core/shell particles. These particles are selected with respect to their particle size in such a way that they fit into the cavities of the sphere packing of the cores and thus cause only little change in the arrangement of the cores. Through specific selection of corresponding materials and/or the particle size, it is firstly possible to modify the optical effects of the sensors, for example to increase their intensity. Secondly, it is possible through incorporation of suitable "quantum dots", to functionalise the matrix correspondingly. Preferred materials are inorganic nanoparticles, in particular nanoparticles of metals or of II–VI or III–V semiconductors or of materials which influence the magnetic properties of the materials. Examples of preferred nanoparticles are gold, zinc sulfide, haematite, gallium nitride or gallium arsenide.

It is preferred here in an embodiment of the present invention for the sensor at the same time to be a pressure control valve or for the sensor to be attached to a pressure control valve. A pressure control valve of this type indicates the increase in pressure through a change in colour even before bursting.

In a further embodiment of the present invention, it is preferred for the sensor to be in the form of a film which is suitable for the coating of surfaces. Surfaces, for example metallic components, can be coated with a film of this type. The film-form surface coating then detects mechanical loads on the component.

In another, likewise preferred embodiment of the present invention, the sensor is in the form of measurement strips which can be clamped between two components in order to detect movement between these components. The possible applications of the sensors according to the invention are not restricted to these preferred embodiments.

In principle, the sensors according to the invention can be employed for the qualitative or semi-quantitative determination of mechanical forces or elongation or compression without a further detection system. All that is needed for detection here is the human eye. Particularly suitable sensors here are those which, as described above, comprise a contrast material.

For the quantitative determination of mechanical forces or elongation or compression, it is advantageous for an automated detection system, which can be, for example, a commercially available VIS spectrometer, to be employed instead of the human eye.

The precise mechanism which results in the uniform orientation of the core/shell particles in the sensors according to the invention was hitherto unknown. However, it has been found that the action of force is essential for the formation of the far-reaching order. It is assumed that the elasticity of the shell material under the processing conditions is crucial for the ordering process. The chain ends of the shell polymers generally attempt to adopt a coiled shape. If two particles come too close, the coils are compressed in accordance with the model concept, and repellent forces arise. Since the shell-polymer chains of different particles also interact with one another, the polymer chains are stretched in accordance with the model if two particles move away from one another. Due to the attempts by the shell-polymer chains to re-adopt a coiled shape, a force arises which pulls the particles closer together again. In accordance with the model concept, the far-reaching order of the particles in the sensor is caused by the interaction of these forces.

Particularly suitable core/shell particles for the production of sensors according to the invention have proven to be those whose shell is bonded to the core via an interlayer.

In a preferred embodiment, the shell of these core/shell particles essentially consists of uncrosslinked organic polymers, which are preferably grafted onto the core via an at least partially crosslinked interlayer.

The shell here can consist either of thermoplastic or elastomeric polymers. Since the shell essentially determines the material properties and processing conditions of the core/shell particles, the person skilled in the art will select the shell material in accordance with the usual considerations in polymer technology. In particular if movements or stresses in a material are to result in optical effects, the use of elastomers as shell material is preferred. In sensors according to the invention, the separations between the core/shell particles are changed by such movements. The wavelengths of the interacting light and the effects to be observed change correspondingly.

The core can consist of a very wide variety of materials. The essential factor according to the invention is, as already stated, that a refractive-index difference to the shell exists and the core remains solid under the processing conditions.

It is furthermore particularly preferred in a variant of the invention for the core to consist of an organic polymer, which is preferably crosslinked.

In another, likewise preferred variant of the invention, the core consists of an inorganic material, preferably a metal or semimetal or a metal chalcogenide or metal pnictide. For the purposes of the present invention, chalcogenides are taken to mean compounds in which an element from group 16 of the Periodic Table of the Elements is the electronegative bonding partner; pnictides are taken to mean those in which an element from group 15 of the Periodic Table of the Elements is the electronegative bonding partner.

Preferred cores consist of metal chalcogenides, preferably metal oxides, or metal pnictides, preferably nitrides or phosphides. Metals in the sense of these terms are all elements which can occur as electropositive partner compared with the counterions, such as the classical metals of the sub-groups, or the main-group metals from the first and second main groups, but also all elements from the third main group, as well as silicon, germanium, tin, lead, phosphorus, arsenic, antimony and bismuth. The preferred metal chalcogenides and metal pnictides include, in particular, silicon dioxide, aluminium oxide, gallium nitride, boron nitride, aluminium nitride, silicon nitride and phosphorus nitride.

The starting materials employed for the production of the core/shell particles according to the invention in a variant of the present invention are preferably monodisperse cores of silicon dioxide, which can be obtained, for example, by the process described in U.S. Pat. No. 4,911,903. The cores here are produced by hydrolytic polycondensation of tetraalkoxysilanes in an aqueous-ammoniacal medium, where firstly a sol of primary particles is produced, and the resultant $SiO_2$ particles are subsequently converted into the desired particle size by continuous, controlled metered addition of tetraalkoxysilane. This process enables the production of monodisperse $SiO_2$ cores having mean particle diameters of between 0.05 and 10 μm with a standard deviation of 5%.

Also preferred as starting material are $SiO_2$ cores which have been coated with (semi)metals or non-absorbent metal oxides, such as, for example, $TiO_2$, $ZrO_2$, $ZnO_2$, $SnO_2$ or $Al_2O_3$. The production of $SiO_2$ cores coated with metal oxides is described in greater detail in, for example, U.S. Pat. No. 5,846,310, DE 198 42 134 and DE 199 29 109.

The starting material employed can also be monodisperse cores of non-absorbent metal oxides, such as $TiO_2$, $ZrO_2$, $ZnO_2$, $SnO_2$ or $Al_2O_3$, or metal-oxide mixtures. Their production is described, for example, in EP 0 644 914. Furthermore, the process of EP 0 216 278 for the production of monodisperse $SiO_2$ cores can readily be applied to other oxides with the same result. Tetraethoxysilane, tetrabutoxytitanium, tetrapropoxyzirconium or mixtures thereof are added in one portion, with vigorous mixing, to a mixture of alcohol, water and ammonia, whose temperature is set precisely to from 30 to 40° C. using a thermostat, and the resultant mixture is stirred vigorously for a further 20 seconds, giving a suspension of monodisperse cores in the nanometre region. After a post-reaction time of from 1 to 2 hours, the cores are separated off in a conventional manner, for example by centrifugation, washed and dried.

Suitable starting materials for the production of the core/shell particles according to the invention are furthermore also monodisperse cores of polymers which contain included particles, for example metal oxides. Materials of this type are available, for example, from micro caps Entwicklungs-und Vertriebs GmbH in Rostock. Microencapsulations based on polyesters, polyamides and natural and modified carbohydrates are produced in accordance with customer-specific requirements.

It is furthermore possible to employ monodisperse cores of metal oxides which have been coated with organic materials, for example silanes. The monodisperse cores are dispersed in alcohols and modified with conventional organoalkoxysilanes. The silanisation of spherical oxide particles is also described in DE 43 16 814.

The cores of the core/shell particles according to the invention may, in addition, also comprise dyes, for example so-called nanocolorants, as described, for example, in WO 99/40123. The disclosure content of WO 99/40123 is hereby expressly included in the disclosure content of the present application.

For the intended use of the core/shell particles according to the invention for the production of sensors, it is important that the shell material is filmable, i.e. that it can be softened, visco-elastically plasticised or liquefied by simple measures to such an extent that the cores of the core/shell particles are at least able to form domains having a regular arrangement. The regularly arranged cores in the matrix formed by film formation of the shell of the core/shell particles form a diffraction grating, which causes interference phenomena and thus results in very interesting colour effects.

The materials of core and shell may, as long as they satisfy the conditions indicated above, be of an inorganic, organic or even metallic character or they may be hybrid materials.

In view of the possibility of varying the invention-relevant properties of the cores of the core/shell particles according to the invention as needed, however, it is advantageous for the cores to comprise one or more polymers and/or copolymers (core polymers) or to consist of polymers of this type.

The cores preferably comprise a single polymer or copolymer. For the same reason, it is advantageous for the shell of the core/shell particles according to the invention likewise to comprise one or more polymers and/or copolymers (shell polymers; matrix polymers) or polymer precursors and, if desired, auxiliaries and additives, where the composition of the shells may be selected in such a way that it is essentially dimensionally stable and tack-free in a non-swelling environment at room temperature.

With the use of polymer substances as shell material and, if desired, core material, the person skilled in the art gains the freedom to determine their relevant properties, such as, for example, their composition, the particle size, the mechanical data, the refractive index, the glass transition temperature, the melting point and the core:shell weight ratio and thus also the applicational properties of the core/shell particles, which ultimately also affect the properties of the sensors produced therefrom.

Polymers and/or copolymers which may be present in the core material or of which it consists are high-molecular-weight compounds which conform to the specification given above for the core material. Both polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters, polyamides, polycarbonates, poly-ureas and polyurethanes, but also amino and phenolic resins, such as, for example, melamine-formaldehyde, urea-formaldehyde and phenol-formaldehyde condensates, are suitable.

For the production of epoxy resins, which are likewise suitable as core material, epoxide prepolymers, which are obtained, for example, by reaction of bisphenol A or other bisphenols, resorcinol, hydroquinone, hexanediol or other aromatic or aliphatic diols or polyols, or phenol-formaldehyde condensates, or mixtures thereof with one another, with epichlorohydrin or other di- or polyepoxides, are usually mixed with further condensation-capable compounds directly or in solution and allowed to cure.

The polymers of the core material are advantageously, in a preferred variant of the invention, crosslinked (co)polymers, since these usually only exhibit their glass transition at high temperatures. These crosslinked polymers may either already have been crosslinked during the polymerisation or polycondensation or copolymerisation or copolycondensation or may have been post-crosslinked in a separate process step after the actual (co)polymerisation or (co)polycondensation.

A detailed description of the chemical composition of suitable polymers follows below.

In principle, polymers of the classes already mentioned above, if they are selected or constructed in such a way that they conform to the specification given above for the shell polymers, are suitable for the shell material and for the core material.

For certain applications of the sensors, such as, for example, for the production of coatings or coloured films, it is favourable, as already stated above, for the polymer material of the matrix phase-forming shell of the core/shell particles according to the invention to be an elastically deformable polymer, for example a polymer having a low glass transition temperature. In this case, it is possible to achieve a situation in which the colour of the sensor according to the invention varies on elongation and compression. Also of interest for the application are core/shell particles according to the invention which, on film formation, result in sensors which exhibit dichroism.

Polymers which meet the specifications for a shell material are likewise present in the groups of polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters and polyamides.

Taking into account the above conditions for the properties of the shell polymers (=matrix polymers), selected units from all groups of organic film formers are in principle suitable for their production.

Some further examples are intended to illustrate the broad range of polymers which are suitable for the production of the shells.

If the shell is intended to have a comparatively low refractive index, polymers such as polyethylene, polypropylene, polyethylene oxide, polyacrylates, polymethacrylates, polybutadiene, polymethyl methacrylate, polytetrafluoroethylene, polyoxymethylene, polyesters, polyamides, poly-epoxides, polyurethane, rubber, polyacrylonitrile and polyisoprene, for example, are suitable.

If the shell is intended to have a comparatively high refractive index, polymers having a preferably aromatic basic structure, such as polystyrene, polystyrene copolymers, such as, for example, SAN, aromatic-aliphatic polyesters and polyamides, aromatic polysulfones and polyketones, polyvinyl chloride, polyvinylidene chloride and, on suitable selection of a high-refractive-index core material, also polyacrylonitrile or polyurethane, for example, are suitable for the shell.

In an embodiment of core/shell particles which is particularly preferred in accordance with the invention, the core consists of crosslinked polystyrene and the shell of a polyacrylate, preferably polyethyl acrylate and/or polymethyl methacrylate.

With respect to particle size, particle-size distribution and refractive-index differences, the above-stated regarding the sensors applies analogously to the core/shell particles according to the invention.

With respect to the processability of the core/shell particles into sensors, it is advantageous for the core:shell weight ratio to be in the range from 2:1 to 1:5, preferably in the range from 3:2 to 1:3 and particularly preferably in the region from 1:1 to 2:3. In general, it is advantageous to increase the shell proportion if the particle diameter of the cores increases.

The core/shell particles to be employed in accordance with the invention can be produced by various processes. A preferred way of obtaining the particles is a process for the production of core/shell particles by a) surface treatment of monodisperse cores, and b) application of the shell of organic polymers to the treated cores.

In a process variant, the monodisperse cores are obtained in step a1) by emulsion polymerisation.

In a preferred variant of the invention, a crosslinked polymeric interlayer, which preferably contains reactive centres to which the shell can be covalently bonded, is applied to the cores in step a), preferably by emulsion polymerisation or by ATR polymerisation. ATR polymerisation here stands for atom transfer radical polymerisation, as described, for example, in K. Matjaszewski, Practical Atom Transfer Radical Polymerisation, Polym. Mater. Sci. Eng. 2001, 84. The encapsulation of inorganic materials by means of ATRP is described, for example, in T. Werne, T. E. Patten, Atom Transfer Radical Polymerisation from Nanoparticles: A Tool for the Preparation of Well-Defined Hybrid $NaNO_3$ structures and for Understanding the Chemistry of Controlled/"Living" Radical Polymerisation from Surfaces, J. Am. Chem. Soc. 2001, 123, 7497–7505 and WO 00/11043. The performance both of this method and of emulsion polymerisations is familiar to the person skilled in the art of polymer preparation and is described, for example, in the above-mentioned literature references.

The liquid reaction medium in which the polymerisations or copolymerisations can be carried out consists of the solvents, dispersion media or diluents usually employed in polymerisations, in particular in emulsion polymerisation processes. The choice here is made in such a way that the emulsifiers employed for homogenisation of the core particles and shell precursors are able to develop adequate efficacy. Suitable liquid reaction media for carrying out the process according to the invention are aqueous media, in particular water.

Suitable for initiation of the polymerisation are, for example, polymerisation initiators which decompose either thermally or photochemically, form free radicals and thus initiate the polymerisation. Preferred thermally activatable polymerisation initiators here are those which decompose at between 20 and 180° C., in particular at between 20 and 80° C. Particularly preferred polymerisation initiators are peroxides, such as dibenzoyl peroxide, di-tert-butyl peroxide, peresters, percarbonates, perketals, hydroperoxides, but also inorganic peroxides, such as $H_2O_2$, salts of peroxosulfuric acid and peroxodisulfuric acid, azo compounds, alkylboron compounds, and hydrocarbons which decompose homolytically. The initiators and/or photoinitiators, which, depending on the requirements of the polymerised material, are employed in amounts of between 0.01 and 15% by weight, based on the polymerisable components, can be used individually or, in order to utilise advantageous synergistic effects, in combination with one another. In addition, use is made of redox systems, such as, for example, salts of peroxodisulfuric acid and peroxosulfuric acid in combination with low-valency sulfur compounds, particularly ammonium peroxodisulfate in combination with sodium dithionite.

Corresponding processes have also been described for the production of polycondensation products. Thus, it is possible for the starting materials for the production of polycondensation products to be dispersed in inert liquids and condensed, preferably with removal of low-molecular-weight reaction products, such as water or—for example on use of di(lower alkyl) dicarboxylates for the preparation of polyesters or polyamides—lower alkanols.

Polyaddition products are obtained analogously by reaction of compounds which contain at least two, preferably three, reactive groups, such as, for example, epoxide, cyanate, isocyanate or isothiocyanate groups, with compounds carrying complementary reactive groups. Thus, isocyanates react, for example, with alcohols to give urethanes, with amines to give urea derivatives, while epoxides react with these complementary groups to give hydroxyethers or hydroxyamines. Like the polycondensations, polyaddition reactions can also advantageously be carried out in an inert solvent or dispersion medium.

It is also possible for aromatic, aliphatic or mixed aromatic/aliphatic polymers, for example polyesters, polyurethanes, polyamides, polyureas, polyepoxides or also solution polymers, to be dispersed or emulsified (secondary dispersion) in a dispersion medium, such as, for example, in water, alcohols, tetrahydrofuran or hydrocarbons, and to be post-condensed, crosslinked and cured in this fine distribution.

The stable dispersions required for these polymerisation, polycondensation or polyaddition processes are generally produced using dispersion auxiliaries.

The dispersion auxiliaries used are preferably water-soluble, high-molecular-weight organic compounds having polar groups, such as polyvinylpyrrolidone, copolymers of vinyl propionate or acetate and vinylpyrrolidone, partially saponified copolymers of an acrylate and acrylonitrile, polyvinyl alcohols having different residual acetate contents, cellulose ethers, gelatine, block copolymers, modified starch, low-molecular-weight polymers containing carboxyl and/or sulfonyl groups, or mixtures of these substances.

Particularly preferred protective colloids are polyvinyl alcohols having a residual acetate content of less than 35 mol %, in particular from 5 to 39 mol %, and/or vinylpyrrolidone-vinyl propionate copolymers having a vinyl ester content of less than 35% by weight, in particular from 5 to 30% by weight.

It is possible to use nonionic or ionic emulsifiers, if desired also as a mixture. Preferred emulsifiers are optionally ethoxylated or propoxylated, relatively long-chain alkanols or alkylphenols having different degrees of ethoxylation. or propoxylation (for example adducts with from 0 to 50 mol of alkylene oxide) or neutralised, sulfated, sulfonated or phosphated derivatives thereof. Neutralised dialkylsulfosuccinic acid esters or alkyldiphenyl oxide disulfonates are also particularly suitable.

Particularly advantageous are combinations of these emulsifiers with the above-mentioned protective colloids, since particularly finely divided dispersions are obtained therewith.

Special processes for the production of monodisperse polymer particles have also already been described in the literature (for example R. C. Backus, R. C. Williams, J. Appl. Phys. 19, p. 1186 (1948)) and can advantageously be employed, in particular, for the production of the cores. It need merely be ensured here that the above-mentioned particle sizes are observed. A further aim is the greatest possible uniformity of the polymers. The particle size in particular can be set via the choice of suitable emulsifiers and/or protective colloids or corresponding amounts of these compounds.

Through the setting of the reaction conditions, such as temperature, pressure, reaction duration and use of suitable catalyst systems, which influence the degree of polymerisation in a known manner, and the choice of the monomers employed for their production—in terms of type and proportion—the desired property combinations of the requisite polymers can be set specifically.

Monomers which result in polymers having a high refractive index are generally those which contain aromatic moieties or those which contain heteroatoms having a high atomic number, such as, for example, those halogen atoms, in particular bromine or iodine atoms, sulfur or metal ions, i.e. atoms or atomic groups which increase the polarisability of the polymers.

Polymers having a low refractive index are accordingly obtained from monomers or monomer mixtures which do not contain the said moieties and/or atoms of high atomic number or only do so in a small proportion.

A review of the refractive indices of various common homopolymers is given, for example, in Ullmanns Encyklopäder technischen Chemie [Ullmann's Encyclopaedia of Industrial Chemistry], 5th Edition, Volume A21, page 169. Examples of monomers which can be polymerised by means of free radicals and result in polymers having a high refractive index are:

Group a): styrene, styrenes which are alkyl-substituted on the phenyl ring, α-methylstyrene, mono- and dichlorostyrene, vinylnaphthalene, isopropenylnaphthalene, isopropenylbiphenyl, vinylpyridine, isopropenyl-pyridine, vinylcarbazole, vinylanthracene, N-benzylrmethacrylamide and p-hydroxymethacrylanilide.

Group b): acrylates containing aromatic side chains, such as, for example, phenyl (meth)acrylate (=abbreviated notation for the two compounds phenyl acrylate and phenyl methacrylate), phenyl vinyl ether, benzyl (meth)acrylate, benzyl vinyl ether, and compounds of the formulae:

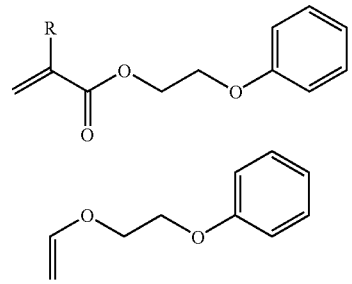

In order to improve clarity and simplify the notation of carbon chains in the formulae above and below, only the bonds between the carbon atoms are shown. This notation corresponds to the depiction of aromatic cyclic compounds, where, for example, benzene is depicted by a hexagon with alternating single and double bonds.

Also suitable are compounds containing sulfur bridges instead of oxygen bridges, such as, for example:

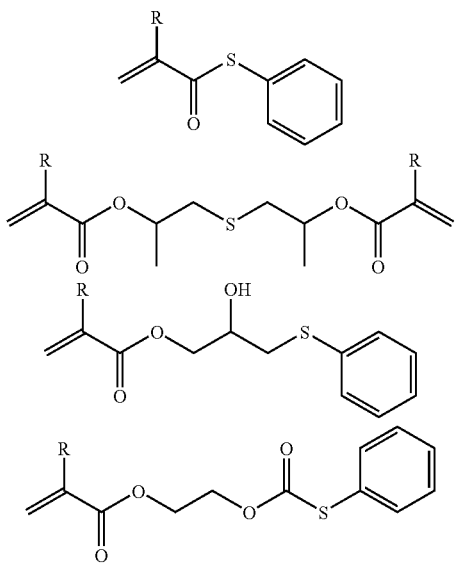

In the above formulae, R is hydrogen or methyl. The phenyl rings in these monomers may carry further substituents. Such substituents are suitable for modifying the properties of the polymers produced from these monomers within certain limits. They can therefore be used in a targeted manner to optimise, in particular, the applicationally relevant properties of the sensors according to the invention.

Suitable substituents are, in particular, halogen, $NO_2$, alkyl having from one to twenty carbon atoms, preferably methyl, alkoxy having from one to twenty carbon atoms, carboxyalkyl having from one to twenty carbon atoms, carbonylalkyl having from one to twenty carbon atoms or —OCOO— alkyl having from one to twenty carbon atoms. The alkyl chains in these radicals may themselves optionally be substituted or interrupted by divalent heteroatoms or groups, such as, for example, —O—, —S—, —NH—, —COO—, —OCO— or —OCOO—, in non-adjacent positions.

Group c): monomers containing heteroatoms, such as, for example, vinyl chloride, acrylonitrile, methacrylonitrile, acrylic acid, methacrylic acid, acrylamide and methacrylamide, or organometallic compounds, such as, for example,

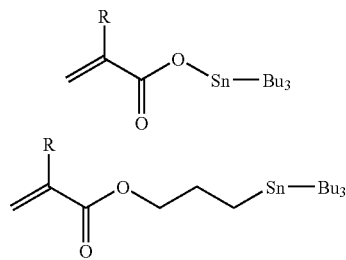

Group d): an increase in the refractive index of the polymers is also achieved by copolymerisation of carboxyl-containing monomers and conversion of the resultant "acidic" polymers into the corresponding salts with metals of relatively high atomic weight, such as, for example, preferably with K, Ca, Sr, Ba, Zn, Pb, Fe, Ni, Co, Cr, Cu, Mn, Sn or Cd.

The above-mentioned monomers, which make a considerable contribution towards the refractive index of the polymers produced therefrom, can be homopolymerised or copolymerised with one another. They can also be copolymerised with a certain proportion of monomers which make a lesser contribution towards the refractive index. Such copolymerisable monomers having a lower refractive index contribution are, for example, acrylates, methacrylates, or vinyl ethers or vinyl esters containing purely aliphatic radicals.

In addition, crosslinking agents which can be employed for the production of crosslinked polymer cores from polymers produced by means of free radicals are also all bifunctional or polyfunctional compounds which are copolymerisable with the above-mentioned monomers or which can subsequently react with the polymers with crosslinking.

Examples of suitable crosslinking agents are presented below, divided into groups for systematisation:

Group 1: bisacrylates, bismethacrylates and bisvinyl ethers of aromatic or aliphatic di- or polyhydroxyl compounds, in particular of butanediol (butanediol di(meth)acrylate, butanediol bisvinyl ether), hexanediol (hexanediol di(meth)acrylate, hexanediol bisvinyl ether), pentaerythritol, hydroquinone, bishydroxyphenylmethane, bishydroxyphenyl ether, bishydroxymethylbenzene, bisphenol A or with ethylene oxide spacers, propylene oxide spacers or mixed ethylene oxide/propylene oxide spacers.

Further crosslinking agents from this group are, for example, di- or polyvinyl compounds, such as divinylbenzene, or methylenebisacrylamide, triallyl cyanurate, divinylethyleneurea, trimethylolpropane tri(meth)acrylate, trimethylolpropane trivinyl ether, pentaerythritol tetra(meth)acrylate, pentaerythritol tetravinyl ether, and crosslinking agents having two or more different reactive ends, such as, for example, (meth)allyl (meth)acrylates of the formulae:

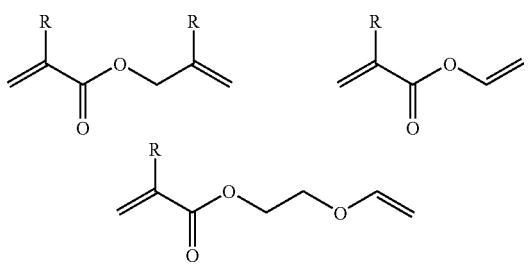

in which R is hydrogen or methyl.

Group 2: reactive crosslinking agents which act in a crosslinking manner, but in most cases in a post-crosslinking manner, for example during warming or drying, and which are copolymerised into the core or shell polymers as copolymers.

Examples thereof are: N-methylol(meth)acrylamide, acrylamidoglycolic acid, and ethers and/or esters thereof with $C_1$- to $C_6$-alcohols, diacetoneacrylamide (DAAM), glycidyl methacrylate (GMA), meth-acryloyloxypropyltrimethoxysilane (MEMO), vinyltrimethoxysilane and m-isopropenylbenzyl isocyanate (TMI).

Group 3: carboxyl groups which have been incorporated into the polymer by copolymerisation of unsaturated carboxylic acids are crosslinked in a bridge-like manner via polyvalent metal ions. The unsaturated carboxylic acids employed for this purpose are preferably acrylic acid, methacrylic acid, maleic anhydride, itaconic acid and fumaric acid. Suitable metal ions are Mg, Ca, Sr, Ba, Zn, Pb, Fe, Ni, Co, Cr, Cu, Mn, Sn and Cd. Particular preference is given to Ca, Mg and Zn, Ti and Zr.

Group 4: post-crosslinked additives, which are taken to mean bis- or polyfunctionalised additives which react irreversibly with the polymer (by addition or preferably condensation reactions) with formation of a network. Examples thereof are compounds which contain at least two of the following reactive groups per molecule: epoxide, aziridine, isocyanate, acid chloride, carbodiimide or carbonyl groups, furthermore, for example, 3,4-dihydroxyimidazolinone and derivatives thereof (®Fixapret products from BASF).

As already explained above, post-crosslinking agents containing reactive groups, such as, for example, epoxide and isocyanate groups, require complementary reactive groups in the polymer to be crosslinked. Thus, isocyanates react, for example, with alcohols to give urethanes, with amines to give urea derivatives, while epoxides react with these complementary groups to give hydroxyethers and hydroxyamines respectively.

The term post-crosslinking is also taken to mean photochemical curing or oxidative or air-or moisture-induced curing of the systems.

The above-mentioned monomers and crosslinking agents can be combined and (co)polymerised with one another as desired and in a targeted manner in such a way that an optionally crosslinked (co)polymer having the desired refractive index and the requisite stability criteria and mechanical properties is obtained.

It is also possible additionally to copolymerise further common monomers, for example acrylates, methacrylates, vinyl esters, butadiene, ethylene or styrene, in order, for example, to set the glass transition temperature or the mechanical properties of the core and/or shell polymers as needed.

It is likewise preferred in accordance with the invention for the application of the shell of organic polymers to be carried out by grafting, preferably by emulsion polymerisation or ATR polymerisation. The methods and monomers described above can be employed correspondingly here.

In particular on use of inorganic cores, it may also be preferred for the core to be subjected to a pre-treatment which enables binding of the shell before the shell is polymerised on. This can usually consist in chemical functionalisation of the particle surface, as is known from the literature for a very wide variety of inorganic materials. It may particularly preferably involve application to the surface of chemical functions which, as active chain end, enable grafting-on of the shell polymers. Examples which may be mentioned in particular here are terminal double bonds, epoxy functions and polycondensable groups. The functionalisation of hydroxyl-carrying surfaces with polymers is disclosed, for example, in EP-A-337 144. Further methods for the modification of particle surfaces are well known to the person skilled in the art and are described, for example, in various textbooks, such as Unger, K. K., Porous Silica, Elsevier Scientific Publishing Company (1979).

The sensors according to the invention may themselves be plastic sensors which are sold as end products. In another preferred embodiment of the present invention, the sensors are films which are suitable for coating surfaces. Another area of application of the sensor materials according to the invention is in decorative applications. Thus, the sensor materials according to the invention can be integrated into textiles, such as clothing, in particular sports clothing. For example, parts of sports shoes can be manufactured from these materials. If the materials are used in areas which deform during movement, a further colour effect which is correlated with the stretching and compression of the material is observed in addition to the angle-dependent colour effect. In a further preferred embodiment of this invention, the sensors are converted into pigments. The pigments obtainable in this way are particularly suitable for use in paints, surface coatings, printing inks, plastics, ceramics, glasses and cosmetic formulations. These pigments exhibit the colour effect discussed above on mechanical stressing and can thus develop an additional decorative effect. For this purpose, they can also be employed mixed with commercially available pigments, for example inorganic and organic absorption pigments, metal-effect pigments and LCP pigments. The particles according to the invention are furthermore also suitable for the production of pigment preparations and for the production of dry preparations, such as, for example, granules. Pigment particles of this type preferably have a platelet-shaped structure with an average particle size of 5 µm–5 mm.

The pigments can be produced, for example, by firstly producing a film from the core/shell particles, which may optionally be cured. The film can subsequently be comminuted in a suitable manner by cutting or crushing and, if desired, subsequent grinding to give pigments of suitable size. This operation can be carried out, for example, in a continuous belt process.

The pigment according to the invention can then be used for the pigmentation of surface coatings, powder coatings, paints, printing inks, plastics and cosmetic formulations, such as, for example, of lipsticks, nail varnishes, cosmetic sticks, compact powders, make-ups, shampoos and loose powders and gels.

The concentration of the pigment in the application system to be pigmented is generally between. 0.1 and 70% by weight, preferably between 0.1 and 50% by weight and in particular between 1.0 and 20% by weight, based on the total solids content of the system. It is generally dependent on the specific application. Plastics usually comprise the pigment according to the invention in amounts of from 0.01 to 50% by weight, preferably from 0.01 to 25% by weight, in particular from 0.1 to 7% by weight, based on the plastic composition. In the coatings area, the pigment mixture is employed in amounts of from 0.1 to 30% by weight, preferably from 1 to 10% by weight, based on the coating dispersion. In the pigmentation of binder systems, for example for paints and printing inks for gravure printing, offset printing or screen printing, or as precursor for printing inks, for example in the form of highly pigmented pastes, granules, pellets, etc., pigment mixtures with spherical colorants, such as, for example, $TiO_2$, carbon black, chromium oxide, iron oxide, and organic "coloured pigments", have proven particularly suitable. The pigment is generally incorporated into the printing ink in amounts of 2–35% by weight, preferably 5–25% by weight and in particular 8–20% by weight. Offset printing inks can comprise the pigment in amounts of up to 40% by weight or more. The precursors for printing inks, for example in the form of granules, as pellets, briquettes, etc., comprise up to 95% by weight of the pigment according to the invention in addition to the binder and additives. The invention thus also relates to formulations which comprise the pigment according to the invention.

The following examples are intended to explain the invention in greater detail without limiting it.

EXAMPLES

Abbreviations Used:
BDDA butane-1,4-diol diacrylate
SDS dodecyl sulfate sodium salt
SDTH sodium dithionite
APS ammonium peroxodisulfate
KOH potassium hydroxide
ALMA allyl methacrylate
MMA methyl methacrylate
EA ethyl acrylate

Example 1

Production of Core/Shell Particles

A mixture, held at 4° C., consisting of 217 g of water, 0.4 g of butanediol diacrylate, 3.6 g of styrene (BASF, destabilised) and 80 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Directly after the introduction, the reaction is initiated by direct successive addition of 50 mg of sodium dithionite (Merck), 250 mg of ammonium peroxodisulfate (Merck) and a further 50 mg of sodium dithionite (Merck), in each case dissolved in 5 g of water. After 10 minutes, a monomer emulsion comprising 6.6 g of butanediol diacrylate, 59.4 g of styrene (BASF, destabilised), 0.3 g of SDS, 0.1 g of KOH and 90 g of water is metered in continuously over a period of 210 minutes. The reactor contents are stirred for 30 minutes without further addition. A second monomer emulsion comprising 3 g of allyl methacrylate, 27 g of methyl methacrylate. (BASF, destabilised), 0.15 g of SDS (Merck) and 40 g of water is subsequently metered in continuously over a period of 90 minutes. The reactor contents are subsequently stirred for 30 minutes without further addition. A monomer emulsion comprising 130 g of ethyl arcylate (BASF,destabilised), 139 g of water and 0.33 g of SDS (Merck) is subsequently metered in continuously over a period of 180 minutes. The mixture is subsequently stirred for a further 60 minutes for virtually complete reaction of the monomers. The core/shell particles are subsequently precipitated in 1 l of methanol, 1 l of distilled water is added, and the particles filtered off with suction and dried.

Scanning and transmission electron photomicrographs of the core/shell particles show that the particles have a particle size of 220 nm.

While carring out the experiment analogously, the particle size of the particles can be varied via the surfactant concentration in the initially introduced mixture. Selection of corresponding amounts of surfactant gives the following particle sizes:

| Amount of surfactant [mg of SDS] | Particle size [nm] |
| --- | --- |
| 80 | 220 |
| 90 | 200 |
| 100 | 180 |
| 110 | 160 |

Example 1a

Production of a Film Having an Opalescent Effect

The core/shell particles resulting from Example 1 are heated to a temperature of 120° C. without pressure in a Collin 300P press and pressed at pressure of 30 bar to give a film. After cooling to room temperature, the pressure is reduced again.

The result is film (FIG. 1) in which the core/shell particles form close sphere packing. The film firstly exhibits colour effects which are dependent on the viewing angle and secondly those which occur on elongation or compression of the film. FIG. 2 shows absorption spectra of a sensor film of this type (particle size of the core/shell particles: 200 nm) measured in the relaxed state of the film ($\epsilon=0$) and after elongation by 6% ($\epsilon=6$) and 12% ($\epsilon=12$) of the original film length. The spectrum was recorded using a Perkin Elmer Lambda 900 UV/VIS spectrometer.

Example 2

Production of Granules of the Core/Shell Particles 3 kg of the core/shell particles from Example 1 are comminuted in a cutting mill (Rapid, model 1528) with ice cooling and subsequently mixed with 2% by weight of black pigment (Iriodin® 600 or Black Mica®; Merck) or with 0.2% by weight of a coloured absorption pigment (for example PV-Echtblau A2R; Clariant) and suitable processing assistants (0.1% by weight of antioxidants, 0.2% by weight of UV stabilisers, 0.2% by weight of mould-release agents and 0.2% by weight of flow improvers). After 15 minutes in the drum mixer (Engelmann; model ELTE 650), the mixture is compounded in a single-screw extruder (Plasti-Corder; Brabender; screw diameter 19 mm with 1-hole die (3 mm)). After a cooling zone, the extrudate is granulated in an A 90-5 granulator (Automatik). 0.2% by weight of release agent are subsequently added to the granules in the drum mixer over the course of 10 minutes.

Example 3

Production of a Sensor Film Having an Opalescent Effect 2 g of the granules from Example 2 are heated to a temperature of 120° C. without pressure in a Collin 300P press and pressed at a pressure of 30 bar to give a film. After cooling to room temperature, the pressure is reduced again.

Transmission electron photomicrographs (FIG. 3) show particles having a size of 180 nm and in each case a contrast material particle. It can be seen that the alignment of the cores in the shell matrix to give an extended crystal lattice is scarcely affected by the contrast material.

Figure 5:
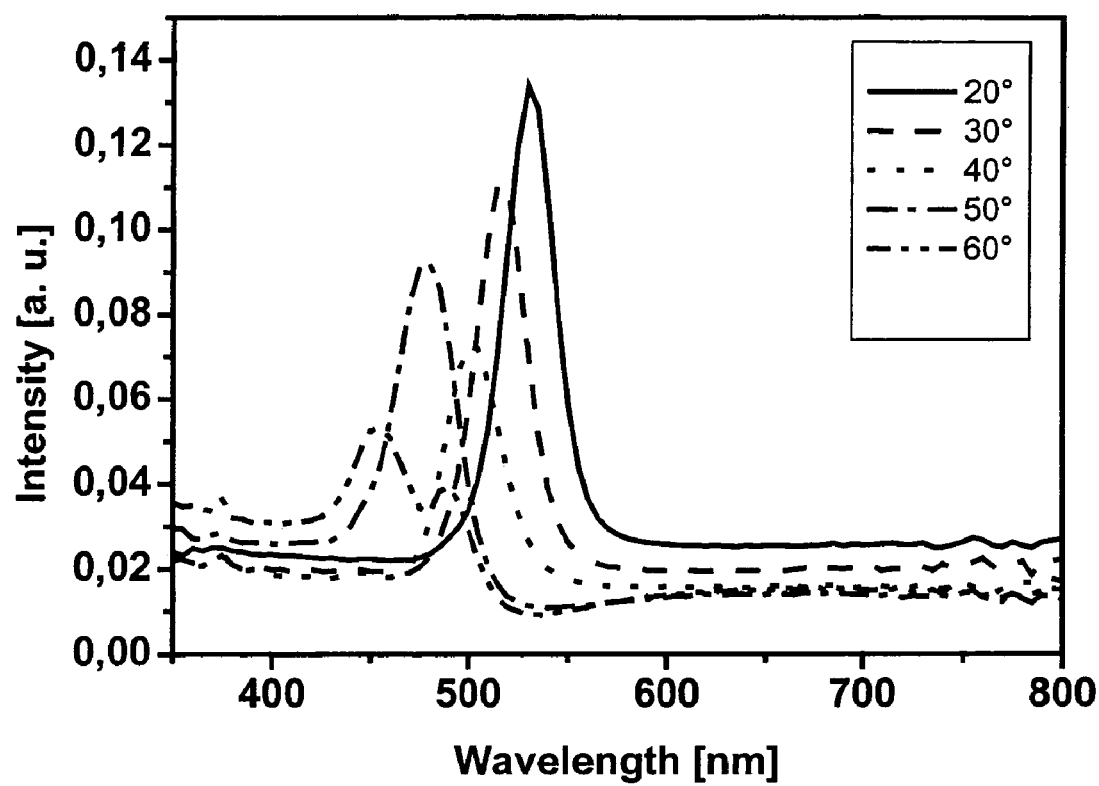
Figure 6:
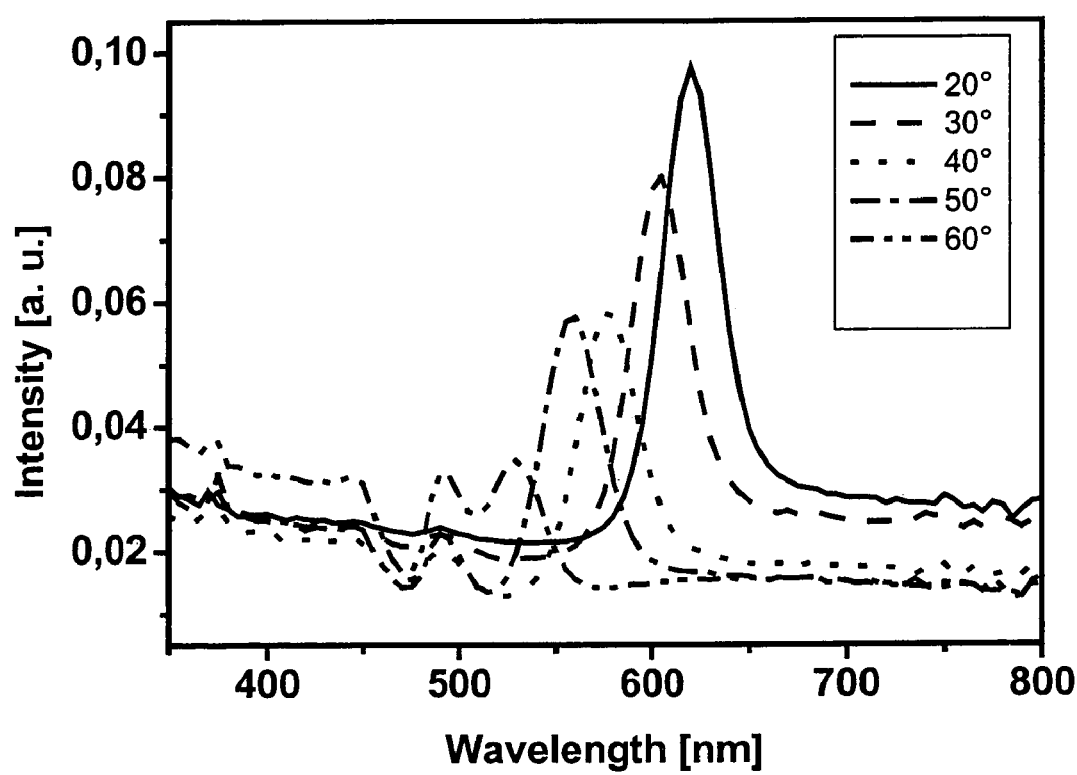

The optical analysis (visual or VIS reflection spectroscopy) confirms that core/shell particles having a size of 160 nm (FIG. 4) result in films having a blue basic colour, core/shell particles having a size of 180 nm result in films having a green basic colour (FIG. 5), and core/shell particles having a size of 220 nm result in films having a red basic colour (FIG. 6). The spectra were measured using a Perkin Elmer Lambda 900 UV/VIS/NIR spectrometer with optical bench. The directed reflection was recorded at various irradiation angles in single-beam operation, and the spectra were standardised by means of a single-channel spectrum. The spectra confirm the visual impression of the colour flop of the sensor films.

Elongation- and compression-dependent effects are observed with a comparable colour shift as described in Example 1a.

Example 4

Production of Mouldings by Injection Moulding 3 kg of the core/shell particles from Example 1 are comminuted in a rapid mill with ice cooling and subsequently mixed with 120 g of pigment (Iriodin® 600) over the course of 30 minutes in a drum mixer (Engelmann). The resultant mixture is compounded in a Plasti-Corder (Brabender), comminuted in an ASG 5-1 granulator (Automatik), and processed further in a Klöckner Ferromatik 75 FX 75-2F injection-moulding machine, giving mouldings having an optical effect which changes on compression and elongation.

Example 5

Production of Sensor Materials Comprising Core/Shell Particles Having a Silicon Dioxide Core (150 nm)

66 g of Monospher® 150 suspension (Merck; solids content 38% by weight, corresponding to 25 g of $SiO_2$ monospheres; average particle size 150 nm; standard deviation of the average particle size <5%) are introduced with 354 g of water into a stirred twin-wall reactor, held at 25° C. fitted with argon protective-gas inlet, reflux condenser and propeller stirrer, a solution of 450 mg of aluminium trichloride hexahydrate (Acros) in 50 ml is added, and the mixture is stirred vigorously for 30 minutes. A solution of 40 mg of sodium dodecylsulfate in 50 g of water is subsequently added, and the mixture is stirred vigorously for a further 30 minutes.

50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and 25 g of ethyl acrylate are metered in continuously over a period of 120 minutes. The reactor contents are subsequently stirred at 75° C. for a further 60 minutes for complete reaction of the monomer.

The resultant hybrid material is filtered off and dried and converted into a film in accordance with Example 2 or injection-moulded to give a moulding in accordance with Example 3. The resultant sensor materials likewise exhibit angle- and compression-or elongation-dependent colour changes.

Example 6

Production of Sensor Materials Comprising Core/Shell Particles Having a Silicon Dioxide Core (250 nm)

60 g of Monospher® 250 (Merck; average particle size 250 nm; standard deviation of the average particle size <5%) are suspended. 3.2 g of $AlCl_3$ and 1.9 g of $Na_2SO_4$ are added to the suspension. 5.9 g of 3-methacryloxypropyltrimethoxysilane are added dropwise at pH=2.6 and 75° C. At 75° C., a pH=8.5 is set by addition of, sodium hydroxide solution. After hydrolysis, the resultant powder is separated off and dried.

90 g of water and 50 mg of sodium dodecylsulfate are added to 10 g of the functionalised Monospher® 250, and the mixture is stirred vigorously for 1 day for dispersal. The suspension is subsequently dispersed in a homogeniser (Niro Soavi, NS1001L). 70 g of water are added to the dispersion, and the mixture is cooled to 4° C.

The dispersion is subsequently introduced into a stirred twin-wall reactor fitted with argon protective-gas inlet, reflux condenser and propeller stirrer. 50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and an emulsion of 10 g of ethyl acrylate and 20 g of water is metered in continuously over a period of 120 minutes. The reactor contents are subsequently stirred at 75° C. for a further 60 minutes for complete reaction of the monomer.

The resultant hybrid material is precipitated in a solution of 10 g of calcium chloride and 500 g of water, filtered off and dried and converted into a film in accordance with Example 2 or injection-moulded to give a moulding in accordance with Example 3. The resultant sensor materials likewise exhibit angle- and compression- or elongation-dependent colour changes.

Example 7

Production of Sensor Materials Comprising Core/Shell Particles having a Core Built up from Silicon Dioxide and an Outer Sheath of Titanium Dioxide 80 g of Monospher® 100(monodisperse silicone dioxide beads having a mean size of 100 nm with a standard deviation of <5%) from Merck KGaA are dispersed in 800 ml of ethanol at 40° C. A freshly prepared solution consisting of 50 g of tetraethyl orthotitanate (Merck KGaA) and 810 ml of ethanol is metered into the Monospher/ethanol dispersion together with deionised water with vigorous stirring. The metering is initially carried out over a period of 5 minutes at a dropwise addition rate of 0.03 ml/min (titanate solution) or 0.72 ml/min. The titanate solution is then added at 0.7 ml/min and the water at 0.03 ml/min until the corresponding containers are completely empty. For further processing, the ethanolic dispersion is stirred under reflux at 70° C. with cooling, and 2 g of methacryloxypropyl-trimethoxysilane (ABCR), dissolved in 10 ml of ethanol, are added over a period of 15 minutes. After the mixture has been refluxed overnight, the resultant powder is separated off and dried. 90 g of water and 50 mg of sodium dodecylsulfate are added to 10 g of the functionalised silicon dioxide/titanium dioxide hybrid particles, and the mixture is stirred vigorously for 1 day for dispersal. The suspension is subsequently dispersed in a homogeniser (Niro Soavi, NS1001L). 70g of water are added to the dispersion, and the mixture is cooled to 4° C.

The dispersion is subsequently introduced into a stirred twin-wall reactor with argon protective-gas inlet, reflux condenser and propeller stirrer. 50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and an emulsion of 10 g of ethyl acrylate and 20 g of water is metered in continuously over a period of 120 minutes. The reactor contents are subsequently stirred at 75° C. for a further 60 minutes for complete reaction of the monomer.

The resultant hybrid material is precipitated in a solution of 10 g of calcium chloride and 500 g of water, filtered off and dried and converted into a film in accordance with Example 2 of injection-moulded to gibe a moulding in accordance with Example 3. The resultant sensor materials likewise exhibit angle- and compression or elongation-dependent colour changes.

Example 8

Pressure Display

A sensor film according to Example 3 (thickness 1 mm) is clamped over an open connector of a pressure line with the aid of clamp ring. After attactment of a vacuum pump (water-jet pump) to the line, the film is elongated by the pressure difference which arises. In the process, the perceived colour changes from green-blue (dependant on the viewing angle) to red-yellow after application of the water-jet vacuum. After the pump has been switched off, the film retards and the colour perceived is again green-blue.

FIGURES

FIG. 1: Transmission electron photomicrograph of a plan view of a film produced in accordance with Example 1a (particle size of the core/shell particles: 180 nm).

FIG. 2: Absorption spectrum of a sensor film according to Example 1a (particle size of the core/shell particles: 200 nm) measured in the relaxed state of the film ($\epsilon$=0) and after elongation by 6% ($\epsilon$=6) and 12% ($\epsilon$=12) of the original film length. The spectrum was recorded using a Perkin Elmer Lambda 900 UV/VIS spectrometer.

Figure 3:

FIG. 3: Transmission electron photomicrograph of a plan view of a film produced in accordance with Examples 1 to 3 (particle size of the core/shell particles: 180 nm; contrast material: 4% by weight of lriodin™ 600). In addition to the ordered core/shell particles (dark-grey dots), a particle of the contrast material lriodin™ 600 can be seen.

Figure 4:
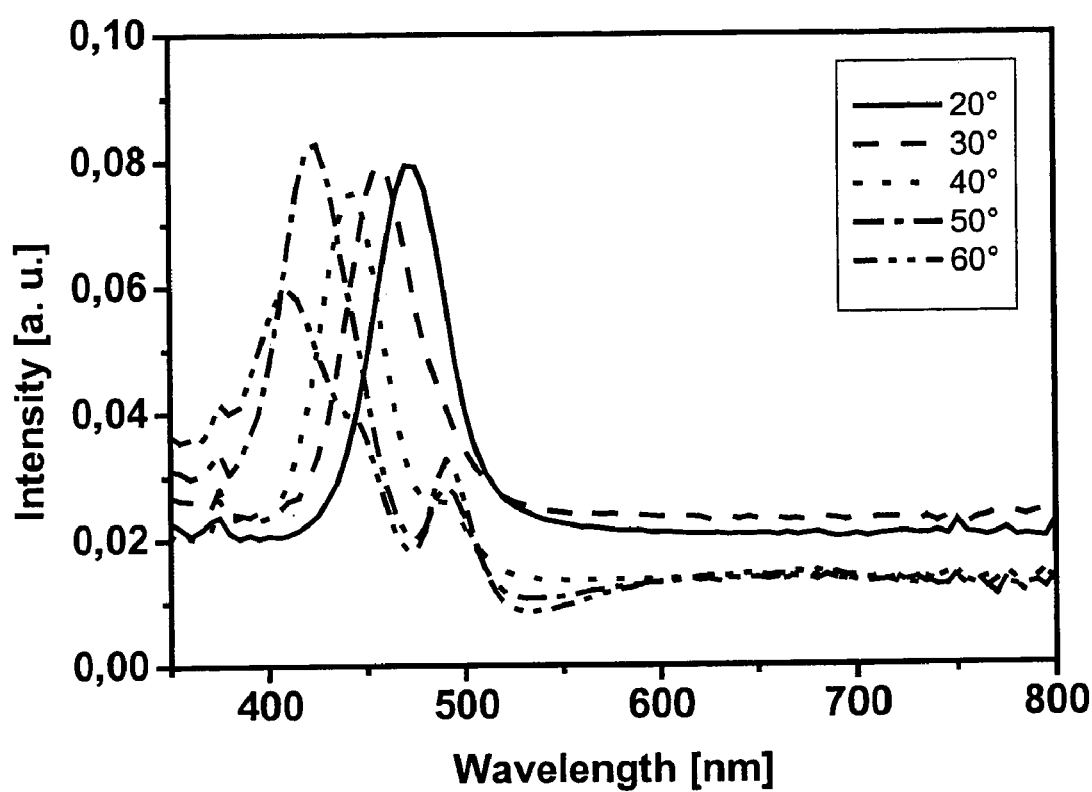

FIG. 4: Reflection spectra of a film of core/shell particles with a size of 160 nm produced as described in Example 3. The spectra were measured using a Perkin Elmer Lambda 900 UV/VIS/NIR spectrometer with optical bench. The directed reflection was recorded at various irradiation angles in single-beam operation, and the spectra were standardised by means of a single-channel spectrum. The spectra confirm the visual impression of the colour flop of the films.

FIG. 5: Reflection spectra of a film of core/shell particles with a size of 180 nm produced as described in Example 3. The spectra were measured using a Perkin Elmer Lambda 900 UV/VIS/NIR spectrometer with optical bench. The directed reflection was recorded at various irradiation angles in single-beam operation. The spectra confirm the visual impression of the colour flop of the films.

FIG. 6: Reflection spectra of a film of core/shell particles with a size of 220 nm produced as described in Example 3. The spectra were measured using a Perkin Elmer Lambda 900 UV/VIS/NIR spectrometer with optical bench. The directed reflection was recorded at various irradiation angles in single-beam operation. The spectra confirm the visual impression of the colour flop of the films.

The invention claimed is:

1. A sensor for detecting the action of mechanical force, consisting essentially of
    core/shell particles whose shell forms a matrix and whose core is essentially solid and has an essentially monodisperse size distribution, where a difference exists between the refractive indices of the core material and shell material and
    at least one contrast material that has been incorporated into the matrix, wherein the shell of the core/shell particles is bonded to the core via an interlayer.

2. A sensor according to claim 1, wherein the core/shell particles have a mean particle diameter of about 5 nm to about 2000 nm.

3. A sensor according to claim 1, wherein the difference between the refractive indices of the core material and shell material is at least 0.001.

4. A sensor according to claim 1, wherein the at least one contrast material is a pigment.

5. A sensor according to claim 1, wherein the particle size of the at least one contrast material is at least twice as large as the particle size of the core material.

6. A sensor according to claim 1, wherein the sensor comprises at least 0.05% by weight of contrast material, based on the weight of the sensor.

7. A sensor according to claim 1, wherein the sensor is a pressure control valve or is attached to a pressure control valve.

8. A sensor according to claim 1, wherein the sensor is in the form of a film which is suitable for the coating of a surface.

9. A sensor according to claim 1, wherein the sensor is in the form of a measurement strip.

10. A sensor according to claim 1, wherein the core/shell particles used for the production of the sensor have a shell that is filmable.

11. A sensor according to claim 1, wherein the core/shell particles used for the production of the sensor have a shell bonded to the core via an interlayer that is a cross-linked polymeric interlayer that optionally contains reactive centres to which the shell can covalently bond.

12. A sensor according to claim 1, wherein the core/shell particles used for the production of the sensor have spherical shaped cores.

13. A process for preparing a sensor for detecting the action of mechanical force, the sensor being according to claim 1, comprising preparing a mixture by mixing together
    core/shell particles whose shell forms a matrix and whose core is essentially solid and has an essentially monodisperse size distribution, wherein the shell of the core/shell particles is bonded to the core via an interlayer and where a difference exists between the refractive indices of the core material and shell material, and
    at least one contrast material.

14. A process according to claim 13, wherein the mixture is subjected to a mechanical force at a temperature at which the shell is flowable.

15. A process according to claim 14, wherein, in a subsequent step, the mixture is cooled, under the action of the mechanical force, to a temperature at which the shell is no longer flowable.

16. A process according to claim 14, wherein the temperature at which the mixture is subjected to the mechanical force is at least 40° C. above the glass transition temperature of the shell.

17. A process according to claim 14, wherein the action of mechanical force takes place by uniaxial pressing.

18. A process according to claim 14, wherein the action of mechanical force takes place during an injection-moulding operation or during extrusion.

19. A method for detecting the action of mechanical force comprising detecting said mechanical force with a sensor according to claim 1.

20. A method for detecting the action of mechanical force on a component comprising detecting said mechanical force with a sensor according to claim 8, which sensor is in the form of a film which is suitable for the coating of a surface.

* * * * *